United States Patent
Garraffa

(10) Patent No.: US 8,220,840 B2
(45) Date of Patent: Jul. 17, 2012

(54) POSITIVE LOCKING DEVICE FOR SNORKELS, SCUBA REGULATORS AND THE LIKE

(75) Inventor: Dean R. Garraffa, Huntington Beach, CA (US)

(73) Assignee: Atomic Aquatics, LLC, Salt Lake City, UT (US)

( * ) Notice: Subject to any disclaimer, the term of this patent is extended or adjusted under 35 U.S.C. 154(b) by 446 days.

(21) Appl. No.: 11/820,983

(22) Filed: Jun. 20, 2007

(65) Prior Publication Data

US 2008/0314381 A1 Dec. 25, 2008

(51) Int. Cl.
*F16L 39/00* (2006.01)
*B63C 11/02* (2006.01)

(52) U.S. Cl. .......... 285/321; 285/39; 285/236; 285/242; 24/457; 128/201.27

(58) Field of Classification Search .................. 285/321, 285/148.2, 231, 232, 235, 236, 237, 239, 285/242, 293.1, 318, 345, 374, 39; 128/201.11, 128/201.27; 24/457, 459, 581.1; 403/DIG. 7
See application file for complete search history.

(56) References Cited

U.S. PATENT DOCUMENTS

| 472,342 | A | * | 4/1892 | Draudt | 285/317 |
|---|---|---|---|---|---|
| 497,374 | A | * | 5/1893 | Hay | 126/318 |
| 2,455,544 | A | * | 12/1948 | Yonkers | 285/7 |
| 3,701,303 | A | * | 10/1972 | Kondo | 411/518 |
| 3,729,027 | A | * | 4/1973 | Bare | 138/109 |
| 4,320,756 | A | * | 3/1982 | Holmes | 128/206.12 |
| 5,215,336 | A | * | 6/1993 | Worthing | 285/81 |
| 5,498,042 | A | * | 3/1996 | Dole | 285/148.27 |
| 5,758,909 | A | * | 6/1998 | Dole et al. | 285/305 |
| 7,785,514 | B2 | | 8/2010 | McCarthy | |

* cited by examiner

*Primary Examiner* — Victor MacArthur
*Assistant Examiner* — Jay R Ripley
(74) *Attorney, Agent, or Firm* — Austin Rapp & Hardman

(57) ABSTRACT

Positive locking device for components of snorkels and other equipment such as diving regulators, buoyancy compensator hoses and the like. The locking device in a preferred embodiment comprises a hard plastic C-shaped ring or clamp which is preferably mechanically and/or chemically bonded into a soft plastic component connector during molding of that component. The ring or clamp provides an effective locking feature which prevents inadvertent demating of components during a dive or other activity that could otherwise result in a dangerous loss of function. An additional embodiment of the invention provides an optional indexing feature which serves the useful function of audible and tactile feedback during adjustment of components having the locking device.

16 Claims, 4 Drawing Sheets

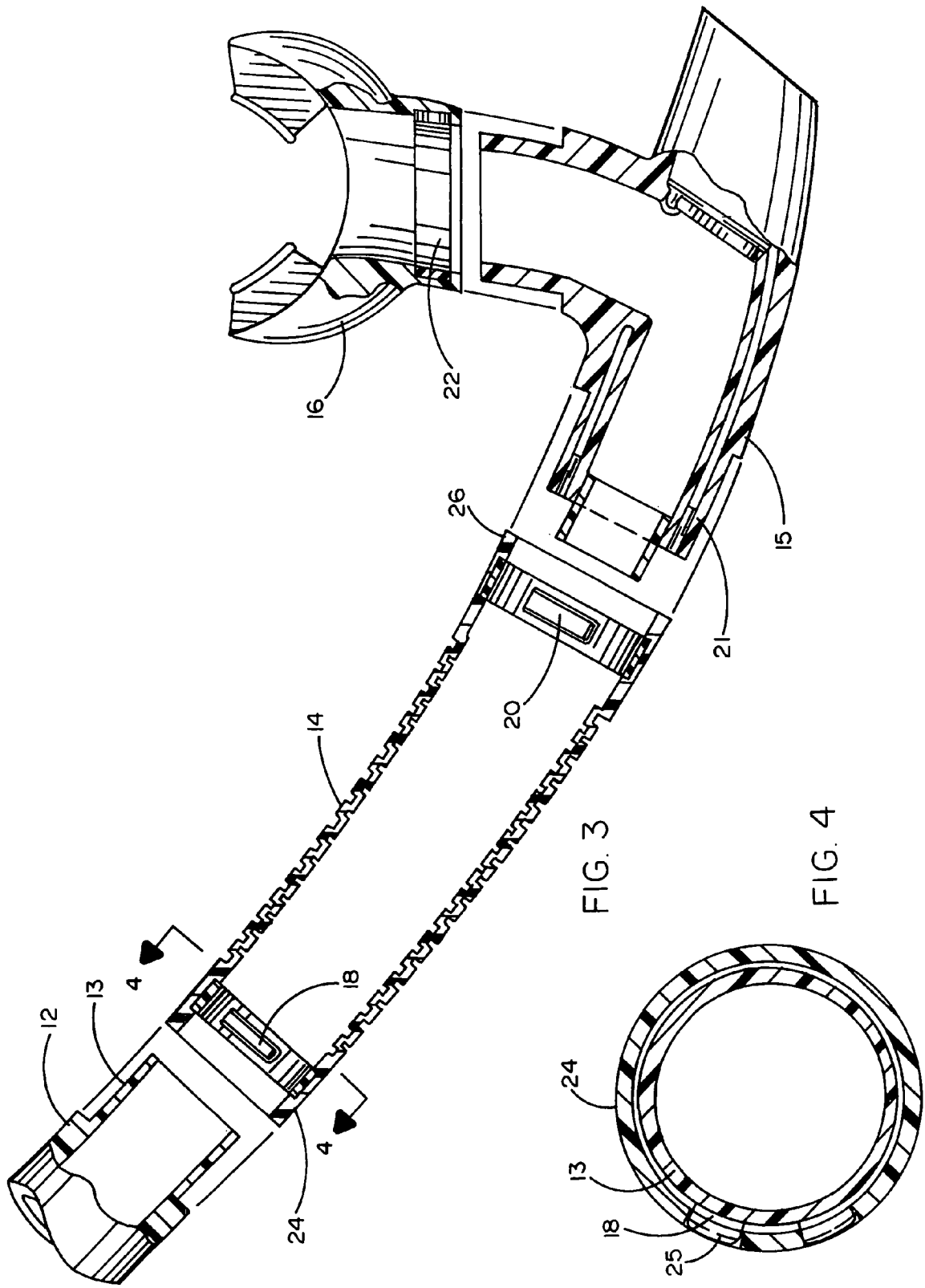

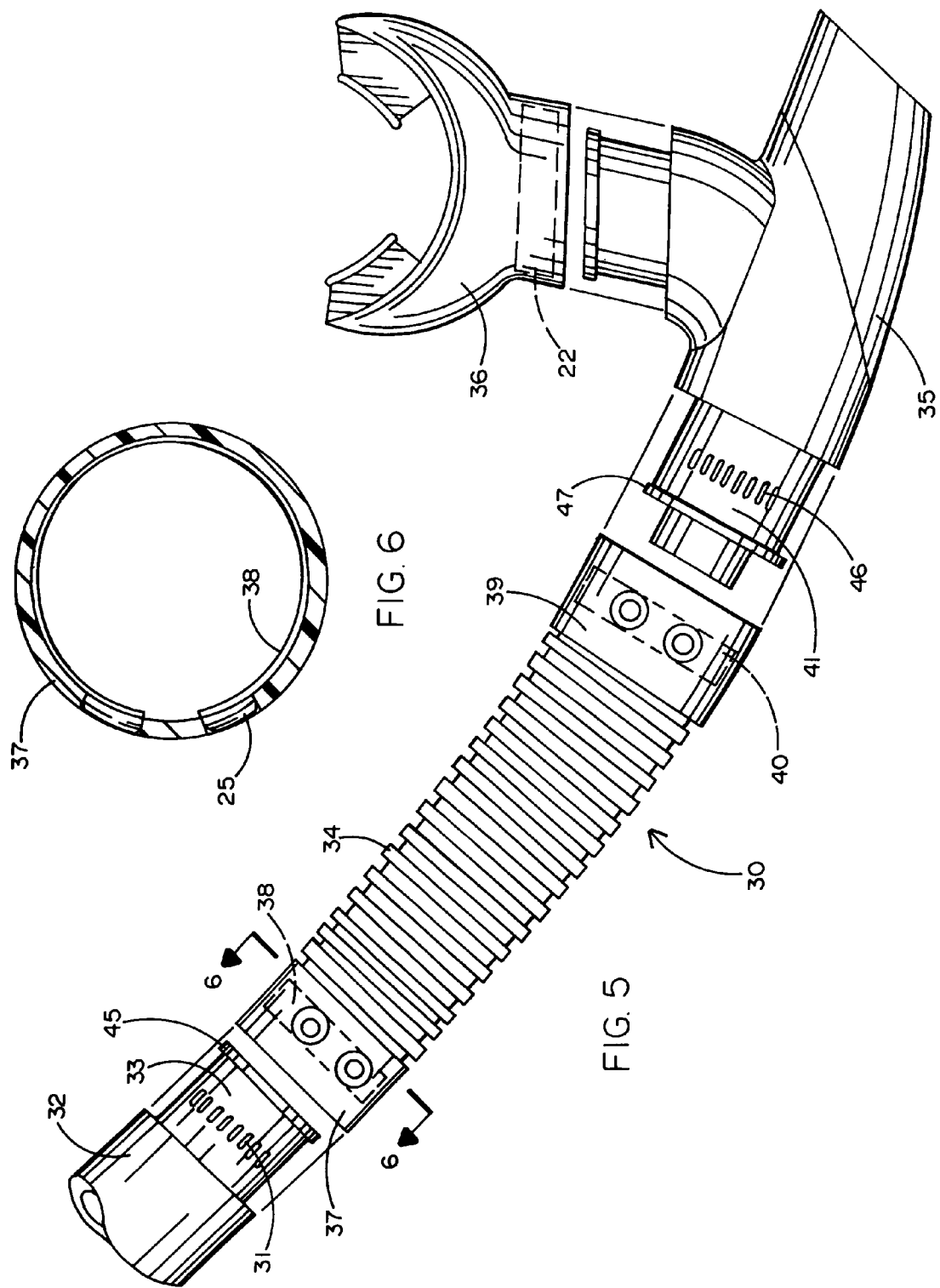

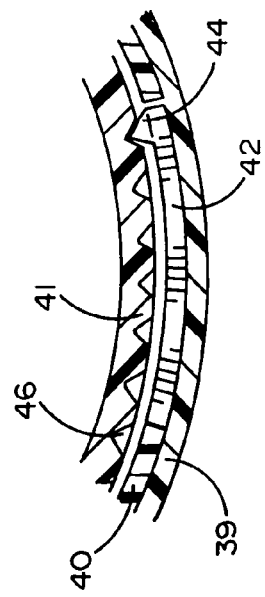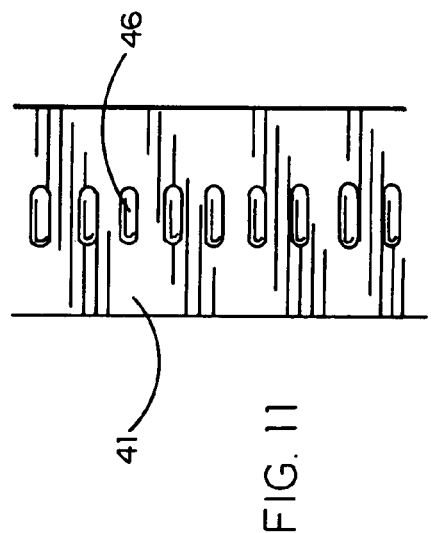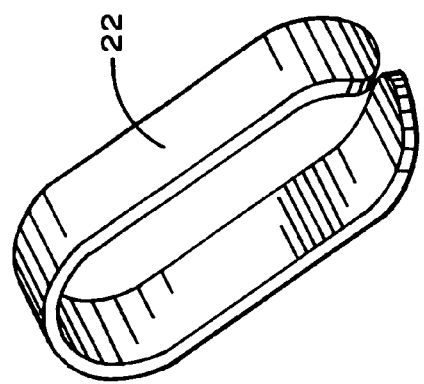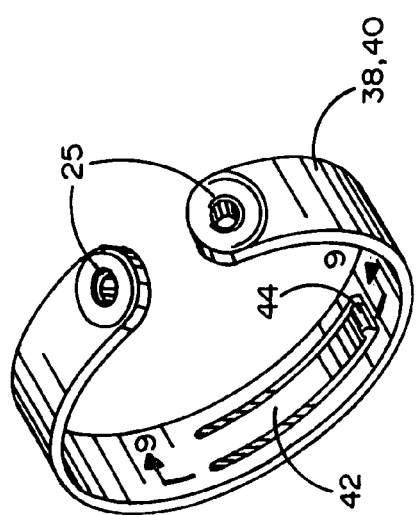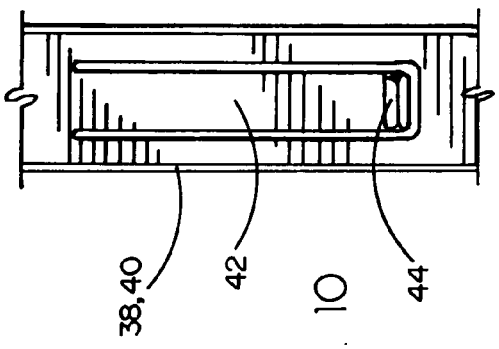

POSITIVE LOCKING DEVICE FOR SNORKELS, SCUBA REGULATORS AND THE LIKE

BACKGROUND OF THE INVENTION

1. Field of the Invention

The present invention relates generally to snorkels, scuba regulators, diver buoyancy devices and more specifically to a snorkel component, or regulator mouthpiece positive locking device, or any flexible hoses found in skin or scuba diving devices.

2. Background Art

Present day scuba diving snorkels suffer from a common design problem. The problem is that certain parts of the snorkel can become accidentally disassembled underwater due to an outdated construction method. The positive locking device prevents snorkel components from accidental dislodging underwater with a novel new method of attachment as outlined below.

When a scuba diver ends his underwater dive, as he reaches the surface, he has been trained to switch from his compressed air breathing regulator to his mask-mounted snorkel in order to breathe while surface swimming to a boat or land exit. As the diver removes the second stage regulator from his mouth and attempts to breathe from the snorkel, he quickly discovers the snorkel he is expecting to breathe from is missing the mouthpiece or even the snorkel's entire lower section. Without delay, he re-locates and returns back into his mouth the compressed air regulator second stage in order to complete the required swim and exit the ocean. This is not an uncommon problem.

The loss of the snorkel function can create added respiratory stress for the scuba diver's surface swim, especially if the remaining air in the scuba cylinder is depleted. This forces the diver to swim and breathe without the aid of the snorkel or compressed air. Scuba divers wear scuba cylinders weight belts, and other heavy equipment and tend to travel low in the water when surface swimming. If surface chop or rough water conditions are present, the diver could be at great risk attempting to breathe and swim through this rough water. So the loss of the snorkel is certainly a safety issue.

Snorkels have an odd shape, with many projecting and hooking points. Further, the snorkel's lower section mouthpiece is molded in a fictive soft rubber material that can become snagged on any object as the diver moves around freely in a weightless underwater environment.

A simple and obvious solution to such a common problem would be to add a low cost hose clamp to the connected parts in order to prevent the parts from separating. However, any type of hose clamp that would be considered tight enough to hold the parts together might also prevent the parts from freely rotating enough to allow the range of adjustments to suit the diver's personal needs. Also, a hose clamp can look somewhat unattractive especially when applied to a highly styled modern snorkel.

What is needed is a new type of clamp design that allows solid connection of these components yet allows for free rotational mobility of these snorkel components, and is hidden from view to make a more cosmetically appealing design to the connected pieces.

A basic snorkel is comprised of several parts, these parts are the barrel, silicone flex hose, flex hose connector and a mouthpiece. The barrel is the longest part and is made of a hard or semi-hard material used to bring fresh air in and expel stale air above and just below the surface of the water. The flex hose is soft and is expected to contour around the face of the user in order the sweep air around the head towards the mouth. The flex hose connector is used to connect to the like hardness soft silicone mouthpiece. The silicone mouthpiece is designed with bite tabs for securing the snorkel and holding the snorkel in proper position while swimming.

Present day snorkels are constructed from a range of different hardness materials. These materials can be classified into separate groups. One such group is the hard plastics category like Polycarbonate and ABS. Another group is the Semi-hard materials like Polyurethane, PVC, and EVA, and finally the soft group such as pliable rubber materials including Silicone and soft grades of thermoplastic rubber or "TPR". The mechanical attachment method in which these groups of different hardness components are connected to each other in series to form a water proof breathing tube or snorkel, is accomplished by utilizing an interference fit, or a stretched over fit.

Normally, this is done by elongating or stretching the soft pliable silicone or TPR rubber component "such as the mouthpiece or flexible ribbed conduit" over a hard or semi-hard or material component such as the barrel designed with undercut grooves, channels, or ribs. This is the way snorkel components have been connected in series since the first snorkel was designed.

SUMMARY OF THE INVENTION

The positive locking device prevents snorkel components from accidentally dislodging underwater with a novel new method of attachment as outlined below. The snorkel-locking device is a plastic to silicone bonded or mechanical bonded plastic snorkel ring that locks the snorkel components together with a positive snap feature. The ring is molded into a snorkel mouthpiece or lower soft section of the snorkel for preventing the snorkel parts snorkel from becoming detached. As an added feature the lock can be designed with indexing notches that indicate the rotational position of the mouthpiece on the snorkel. The lock clamp can have a feature that allows the incorporation of openings or holes to permit snap ring pins that would facilitate easy removal of the entire mouthpiece for changing.

First the positive lock ring is molded from hard plastic, then the ring is inserted into the silicone mold and a soft mouthpiece or connector is molded directly to the ring by a chemical and/or mechanical bond.

The positive lock concept can also be applied to a scuba mouthpiece design that would enable the mouthpiece to be made without an unsightly plastic clamping device seen visually or interfering with the lips or mouth area of the user.

Further it can be anticipated that any type of integral coupling device such as buoyancy control device or "BCD" hose, or a closed circuit re-breather regulator system could benefit from this type silicone molded to hard plastic clamp positive lock design.

BRIEF DESCRIPTION OF THE DRAWINGS

The aforementioned objects and advantages of the present invention, as well as additional objects and advantages thereof, will be more fully understood herein after as a result of a detailed description of a preferred embodiment when taken in conjunction with the following drawings in which:

FIG. 3 is a further enlarged partial cross-sectional view of the snorkel of FIG. 1 with the parts thereof shown disconnected from one another;

FIG. 4 is a cross-sectional view taken along lines 4-4 of FIG. 3;

FIG. 5 is an exterior view of an alternative embodiment of the snorkel of FIG. 1;

FIG. 6 is a cross-sectional view of the embodiment of FIG. 5 taken along lines 6-6;

FIG. 7 is an enlarged three-dimensional view of a positive locking ring or clamp used to secure a barrel to a flex hose or a flex hose to a mouthpiece interface in the alternative embodiment;

FIG. 8 is a singular view of the ring or clamp used in the preferred embodiment to secure a mouthpiece to a mouthpiece interface; and FIGS. 9 to 11 further illustrate the optional indexing feature of the invention wherein FIG. 9 is a cross-sectional view taken along lines 9-9 of FIG. 7.

DETAILED DESCRIPTION OF PREFERRED EMBODIMENTS

Figures 1, 2:
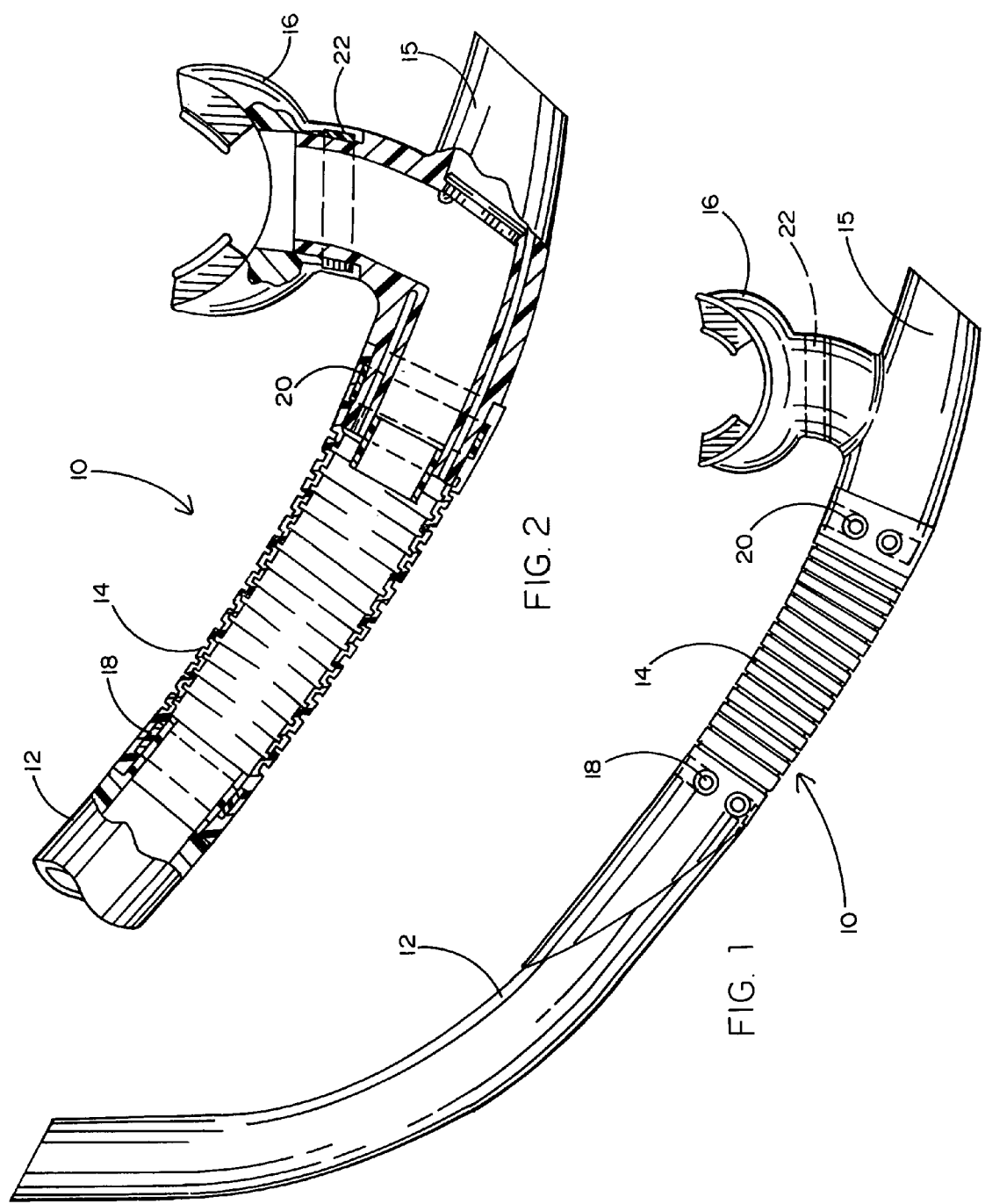
FIG. 1 is a view of a fully assembled snorkel with the positive locking device of the preferred embodiment of the invention.
FIG. 2 is an enlarged, partial cross-sectional view of the snorkel of FIG. 1.

Referring to the accompanying drawings and FIGS. 1 through 4 in particular, it will be seen that a snorkel 10 comprises an elongated barrel 12, connected to a flexible hose 14 which is, in turn, connected to a mouthpiece interface or lower tube 15 to which a mouthpiece 16 is attached.

FIGS. 1 through 4 illustrate a first embodiment of the invention in which these various interconnected sections 12, 14, 15 and 16 are effectively locked to one another by an inventive positive locking ring or clamp 18, 20 and 22, respectively. More specifically, ring or damp 18, which is molded into the female connector 24, of flex hose 14, is used to positively couple the flex hose to the end of barrel 12. Similarly ring or clamp 20, which is molded into the female connector 26 of flex hose 14, is used to positively couple the flex hose to the end of interface or lower tube 15 Furthermore, ring or clamp 22, which is molded into the connector of mouthpiece 16, is used to positively couple the mouthpiece to the interface or lower tube 15. Because each such ring or clamp is made of a hard plastic, it is readily bonded to the inner surface of the corresponding soft plastic component (i.e., flex hose connector or mouthpiece connector) by either or both mechanical or chemical bonding during molding of the soft plastic component. Moreover, because of its hard plastic structure, it will tend to hold its shape even when subjected to an opening stress or force during the connection process. So much so, in fact, that rings or clamps 18 and 20 are preferably provided with unlocking pins 25 which are accessible through apertures in the softer mating plastic of the flex hose connector so that the corresponding ring or clamp 18 and 20 can be forced open with a pair of long nose pliers or other suitable tool to permit disconnection of the mating parts when desired.

As seen best in FIGS. 3 and 4, the rings or clamps 18 and 20 are molded into respective female connectors 24 and 26, respectively, where they are adapted to firmly surround and engage in press-fit relation male connectors 13 and 21 of the barrel 12 and lower tube 15, respectively. This surrounding engagement assures a secure connection that cannot be inadvertently opened while still permitting rotational adjustment of the connected components 12, 14 and 15.

FIGS. 5 through 11 illustrate another embodiment of the present invention. In this embodiment, a snorkel 30 has a barrel 32, a flex tube 34, a lower tube 35 and a mouthpiece 36. Barrel 32 has a male connector 33 which has a plurality of indexing notches 31 and a terminating flange 45. Similarly, lower tube 35 has a male connector 41 which provides a plurality of indexing notches 46 and a terminating flange 47. Flex tube 34 has terminating female connectors 37 and 39 in which there are respectively molded locking rings or clamps 38 and 40.

The detailed structure of the locking rings 38 and 40, as well as the mouthpiece locking ring 22, is shown in FIGS. 7 and 8, respectively. As seen in FIG. 7, rings 38 and 40 are identical hard plastic components, each being substantially C-shaped and having spaced ends with unlocking pins 25, just as the rings or clamps 18 and 20 of the preferred embodiment of FIGS. 1 through 4. However, clamps 38 and 40 each has an indexing member 42 terminating in a notch member 44 which is configured for interacting with indexing notches 31 of connector 33 of barrel 32 or notches 46 of connector 41 of lower tube 35.

As seen best in FIG. 9, notch member 44 of indexing member 42 extends toward male connector 41 where it can interact with indexing notches 46. As a result, whenever the mouthpiece interface 35 and the flex tube 34 are rotated (such as for adjustment of the angular position of mouthpiece 36), the interaction between notch member 44 and indexing notches 46, causes a "clicking" sound as well as a tactile sensation of the interaction much as would be experienced while rotating the bezel of a dive watch. Thus, the alternative embodiment of the present invention shown in FIGS. 5 through 11, provides both a secure locking engagement between the various snorkel components and an indexing "sound and feel" feature that provides a unique form of feedback during adjustment of snorkel components.

Thus, it will now be understood that what has been disclosed herein is a novel positive locking device for components of snorkels and other equipment such as diving regulators, buoyancy compensator hoses and the like. The locking device in a preferred embodiment comprises a hard plastic C-shaped ring or clamp which is preferably mechanically and/or chemically bonded into a soft plastic component connector during molding of that component. The ring or clamp provides an effective locking feature which prevents inadvertent demating of components during a dive or other activity that could otherwise result in a dangerous loss of function.

An additional embodiment of the invention provides an optional indexing feature which serves the useful function of audible and tactile feedback during adjustment of components having the locking device.

I claim:

1. An apparatus for use in diving, the apparatus having a flexible hose interface connection that resists inadvertent demating of compressively engaged overlapping tubular connections, the interface connection comprising:

a first inner connector residing partially within a second outer connector and a positive locking ring comprising:

a C-shaped annular member made of a material that is resistant to deformation; and a pair of unlocking pins at respective opposed terminal locations and extending radially through openings in said second outer connector to facilitate external access to said positive locking ring to demate said first inner connector and said second outer connector;

wherein said positive locking ring being made integral to said outer connector by being bonded to an inner mating surface of said second outer connector during molding of the said second outer connector, said positive locking ring having an inner surface that is fully exposed for compressively engaging an outer mating surface of said first inner connector to prevent inadvertent demating of said first inner connector and said second outer connector tubular connectors; and wherein the positive locking ring C-shaped annular member is substantially underneath the second outer connector when the first inner connector and the second outer connector are mated, wherein said C-shaped annular member is compressively engaged with said outer mating surface of said first inner connector with a sufficient force to prevent inadvertent axial separation of said first inner connector and said second outer connector, but without preventing relative rotation of said first inner connector and said second outer connector.

2. The apparatus recited in claim 1 wherein said annular member is mechanically bonded to said inner mating surface.

3. The apparatus recited in claim 1 wherein said annular member is chemically bonded to said inner mating surface.

4. The apparatus recited in claim 1 wherein said annular member is both mechanically and chemically bonded to said inner mating surface.

5. The apparatus recited in claim 1 wherein said tubular connectors are respective ends of snorkel tube components.

6. The apparatus recited in claim 5 wherein said snorkel tube components comprise a barrel and a flex tube of a snorkel.

7. The apparatus recited in claim 5 wherein said snorkel tube components comprise a flex tube and a lower tube of a snorkel.

8. The apparatus recited in claim 5 wherein said snorkel tube components comprise a lower tube and a mouthpiece of a snorkel.

9. The apparatus recited in claim 1, said annular member further comprising an indexing member terminating in a notch member and wherein said outer mating surface of said first inner connector has a plurality of indexing notches substantially aligned with said notch member for generating a perceivable effect during said relative rotation of said tubular connectors.

10. The apparatus recited in claim 9, wherein said perceivable effect is at least one of an audible and a tactile effect.

11. An apparatus for a snorkel used for diving and swimming, the apparatus comprising:

a plurality of airflow tubular components interconnected by mating tubular connectors configured for press-fit overlapping engagement, wherein a first inner connector resides partially within a second outer connector;

a positive locking ring comprising a C-shaped annular member made of a material that is resistant to deformation;

said positive locking ring having a pair of unlocking pins extending radially through said second outer connector to facilitate external access to said ring to demate said first inner connector and said second outer connector;

wherein said positive locking ring being made integral to said second outer connector by being bonded to an inner mating surface of said second outer connector during molding of the said second outer connector, said positive locking ring having an inner surface that is fully exposed for compressingly engaging an outer mating surface of said first inner connector to prevent inadvertent demating of said first inner connector and said second outer connector, wherein the C-shaped annular member is substantially underneath the second outer connector when the first inner connector and the second outer connector are mated; and wherein said C-shaped annular member is compressively engaged with said outer mating surface of said first inner connector with a sufficient force to prevent inadvertent axial separation of said first inner connector and said second outer connector, but without preventing relative rotation of said first inner connector and said second outer connector.

12. The apparatus recited in claim 11 wherein said annular member is mechanically bonded to said inner mating surface.

13. The apparatus recited in claim 11 wherein said annular member is chemically bonded to said inner mating surface.

14. The apparatus recited in claim 11 wherein said annular member is both mechanically and chemically bonded to said inner mating surface.

15. The apparatus recited in claim 11, said annular member further comprising an indexing member terminating in a notch member and wherein said outer mating surface of said first inner connector has a plurality of indexing notches substantially aligned with said notch member for generating a perceivable effect during said relative rotation of said tubular connectors.

16. The apparatus recited in claim 15, wherein said perceivable effect is at least one of an audible and a tactile effect.

* * * * *